United States Patent [19]

Humphreys

[11] Patent Number: 4,833,555
[45] Date of Patent: May 23, 1989

[54] DISK DRIVE PROVIDING AUTOMATIC HUB SEATING

[75] Inventor: Richard M. Humphreys, Rochester, N.Y.

[73] Assignee: Eastman Kodak Company, Rochester, N.Y.

[21] Appl. No.: 126,086

[22] Filed: Nov. 27, 1987

[51] Int. Cl.$^4$ ............... G11B 17/04; G11B 17/032
[52] U.S. Cl. .................. 360/99.12; 360/99.07; 360/99.03; 360/99.05
[58] Field of Search ............ 360/98.08, 98.06, 99.05, 360/99.12, 99.07, 99.03

[56] References Cited

U.S. PATENT DOCUMENTS 4,703,373 10/1987 Oosaka ..................... 360/99.12

*Primary Examiner*—Robert S. Tupper
*Attorney, Agent, or Firm*—David M. Woods

[57] ABSTRACT

In order to automatically position a magnetic disk relative to a disk drive, the drive includes a pivotable backer that provides positive seating of a central hub (on the disk) upon a drive spindle of a disk drive motor. A shuttle removes a cartridge containing the disk from a magazine and inserts the cartridge into a door offset from the spindle and commonly pivotable with the backer. The backer and door are differentially cammed so that the backer overtravels the door in a substantially continuous motion linked to the insertion movement. A hub seater depending from the backer penetrates an opening in the door to force the hub against the spindle as the door moves the disk into position relative to the drive. The backer then retreats to an offset position in which the hub seater breaks contact with the disk hub before the drive motor is started, thereby inserting the disk securely and seating the hub in one continuous motion without prolonging frictional contact as the disk begins to rotate.

12 Claims, 8 Drawing Sheets

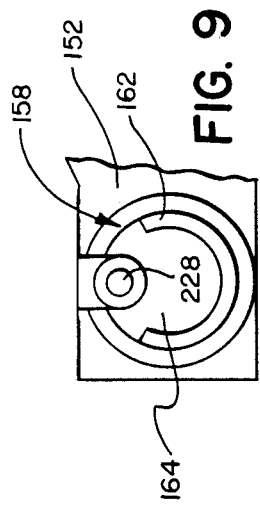
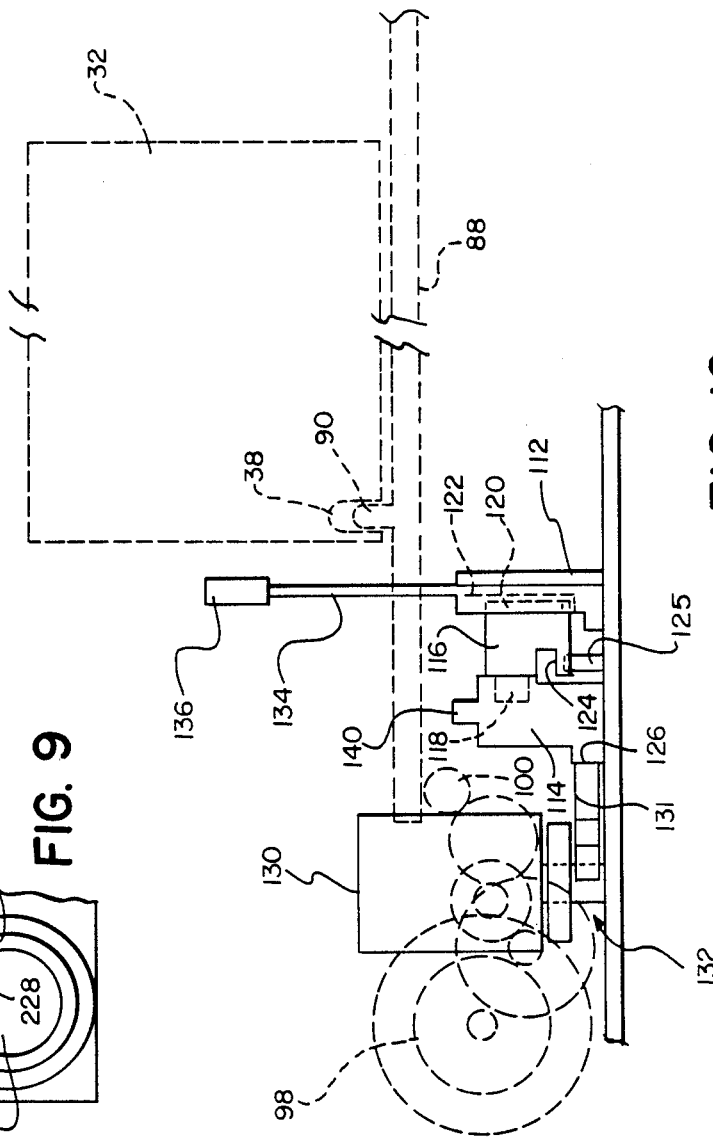

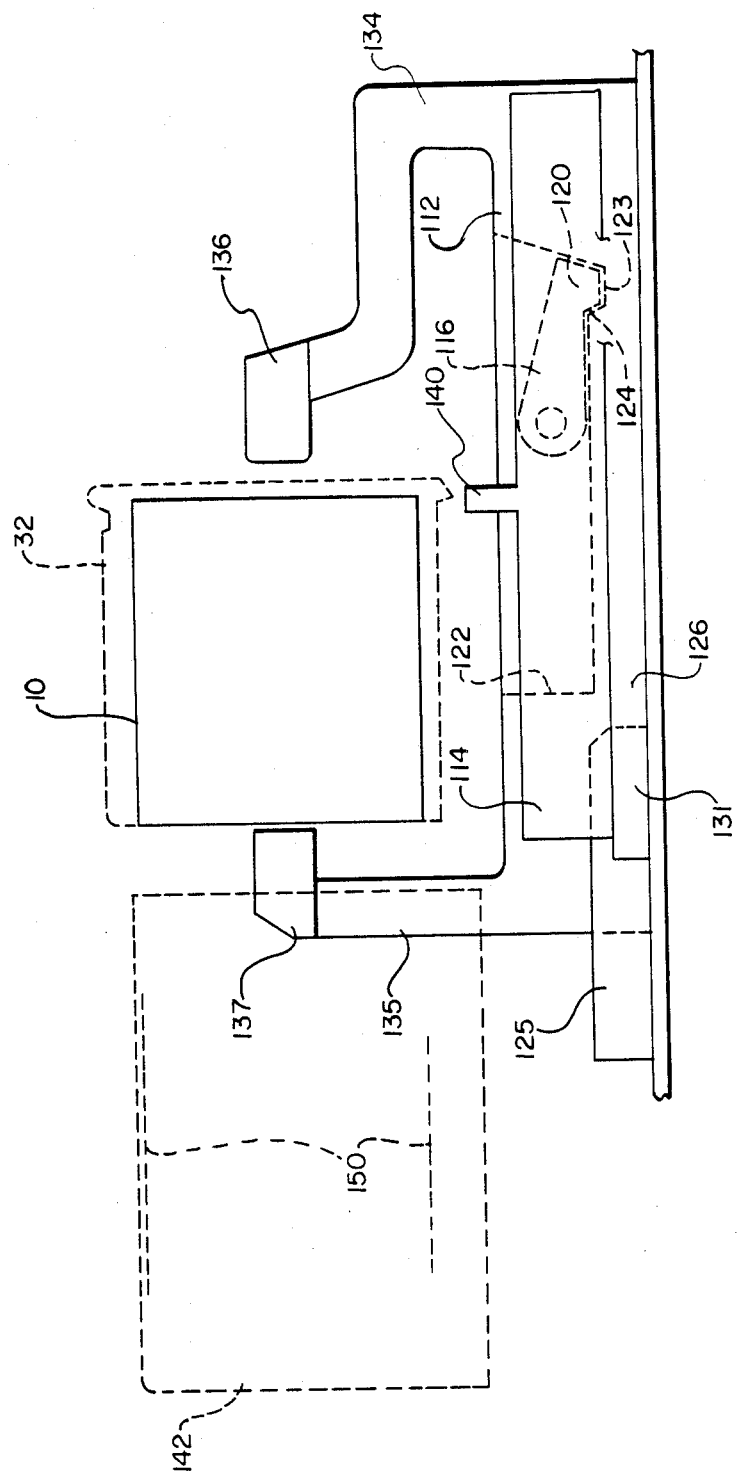

DISK DRIVE PROVIDING AUTOMATIC HUB SEATING

BACKGROUND OF THE INVENTION

1. Field of the Invention

This invention relates to the field of recording and/or reproducing information using disk-shaped storage media, and in particular to a disk drive capable of seating the storage media upon a spindle of a drive motor.

2. Description Relative to the Prior Art

To seat a central hub of a magnetic disk on a drive spindle according to the known technique (as shown by U.S. Pat. No. 4,686,593), a loading door containing the disk is manually overridden by finger pressure beyond a normally locked position. The door has a pressure member which, during the overriding movement, presses upon the central hub to forcibly mount the disk upon the drive spindle. When finger pressure is released, the door retreats to its locked position in which the pressure member is spaced from the hub. The drive motor can thus be operated without frictional contact between the pressure member and the hub.

Reliance on finger pressure is not always effective, or even possible, when the operator is necessarily removed from physical contact with the drive system. In U.S. Pat. No. 4,675,755, which is incorporated herein by reference, a cartridge containing a magnetic disk is mechanically removed from a magazine by a reciprocating shuttle and inserted into a disk drive. After the disk is used, the shuttle retrieves the cartridge from the disk drive and replaces it in the same place in the magazine. Since the disk drive is paced by mechanical requirements, and is effectively inaccessible to the operator, the known technique for hub seating cannot be employed.

SUMMARY OF THE INVENTION

In mechanized systems that insert a cartridge into a drive, it is generally necessary to power the insertion movement with a dedicated advance mechanism. In the aforementioned U.S. Pat. No. 4,675,755, a shuttle is rack-driven by a shuttle motor to push the cartridge into a pivotable door for transporting the disk toward the disk drive. The door pivots between an open position, in which the cartridge is received, to a closed position in which the disk is positioned for engagement with a record/playback head. Seating the hub then requires additional movement, complicated by a thrusting and retreating requirement to avoid continuing frictional contact, before the drive motor can be started.

By interrelating the insertion movement with the seating movement, it is possible to utilize fewer components and accomplish all of the necessary loading movement in one substantially continuous cycle. In addition to the aforementioned door, a backer is mounted relative to a backer pivot for forcing the hub upon the spindle. The backer pivots between three positions: an open position outboard of the door, a position overtravelling the door and forcing the hub upon the spindle and an offset position backed away from the hub. Drive means are operative in combination with the insertion movement for differentially pivoting the door and the backer, the door being pivoted into its operating position while the backer further pivots into its overtravel position and then retreats to its offset position. In this way the backer temporarily overtravels the door to seat the hub before retreating to break contact with the hub.

In a specific embodiment of the invention, the door and backer each include cam follower surfaces and the drive means includes a differential cam for engagement with the cam follower surfaces. Furthermore, the insertion movement can initiate and control the pivoting of the door and the backer, which, in the specific embodiment, are mounted upon a common pivot. Moreover, the ability to consistently control the thrusting force of the backer upon the hub, and to accurately regulate the spacing between the backer in its offset position and the hub surface, enables the backer to be used as a signal pickup for a phase indicator embedded in the hub.

BRIEF DESCRIPTION OF THE DRAWINGS

The invention will be described in relation to the drawings, in which:

FIG. 9 is a front elevation of the hub seater shown in FIG. 6;

FIG. 10 is a sectional view mainly of the shuttle taken along the line 10—10 of FIG. 5, showing also the relative position of the magazine;

FIG. 11 is a sectional side elevation of the shuttle taken along the line 11—11 of FIG. 5, showing the home position of the shuttle relative to the magazine before a cartridge has been removed.

DETAILED DESCRIPTION OF THE PREFERRED EMBODIMENT

Because the art of magnetic recording and playback is well known in general, and specifically in connection with magnetic disks, the present description will for the most part be directed to elements forming part of, or cooperating more directly with, apparatus embodying the present invention. Elements not specifically shown or described may be selected from those known in the art. In addition, the full disclosure of U.S. Pat. No. 4,675,755, which issued June 23, 1987 and is entitled "Video Disk Apparatus Providing Organized Picture Playback", is incorporated by reference into this disclosure. (The disclosure of U.S. Pat. No. 4,675,755 also was published under PCT procedures on Mar. 13, 1986 as International Publication Number WO 86/01631.)

U.S. Pat. No. 4,675,755 discloses a video disk player providing organized picture playback from a plurality of video disks organized into a video picture file. Since the picture file accommodates many pictures prerecorded on many video disks, e.g. 1500 pictures on 30 disks, a removable magazine is provided for storing the disks. Each disk is contained within a storage slot formed in the magazine and can be removed from the magazine under direction of a control circuit in the player. The player circuit not only controls the reproduction of each picture but also retrieves the pictures in a particular arrangement by moving one disk after another into the player. The data necessary for defining this arrangement is contained in a memory module attached to the magazine. To view pictures, the magazine is inserted into the player and the memory module is simultaneously connected into the player circuit. At the same time, the memory module is detached from the magazine so that the magazine can be moved with respect to the stationary module. This schematic overview of the player is found in particular in FIG. 1 and in columns 4-6 of the referenced patent.

Figure 1:
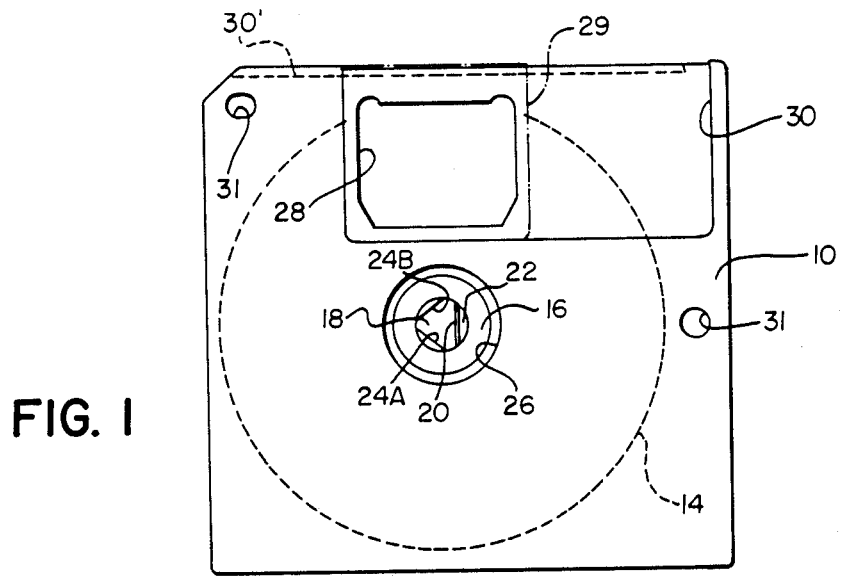
FIG. 1 is a view of a cartridge also enclosing a magnetic disk.

Referring now to FIG. 1 in the present disclosure, a cartridge 10 is shown enclosing a magnetic floppy disk 14 (shown by broken line). The magnetic disk 14 is supported at its center by a central hub 16 with a polygonal center opening 18 which receives a spindle (to be shown later) forming the end of a drive motor shaft. Provided at one side of the center opening 18 is a flat spring 20 separating the center opening 18 from an elongated side opening 22. The spring 20 and the side opening 22 function together to permit the central hub 16 to deform elastically and frictionally engage and grip the spindle. To effect this deformation, the central hub 16 is thrust upon the spindle so that it is positioned at three points between the spring 20 and a pair of reference edges 24A and 24B defined relative to the opening 18 and generally opposite the spring 20.

The cartridge 10 envelopes the magnetic disk 14 on both sides thereof and includes a central opening 26 on both sides permitting the passage of the central hub 16. The cartridge 10 also includes a window 28 on both sides thereof permitting access by a magnetic head (to be shown later) to the disk 14. A shutter member 29 is shown in broken line for sliding along a track 30 to open and close the window 28. The sliding movement results from the engagement of the shutter 29 with a lug (not shown) provided in a disk drive, which contacts the cartridge 10 along a slot 30' between the sides thereof and engages an edge of the shutter 29. Two positioning holes 31 are also provided for locating the cartridge 10 in the disk drive relative to the magnetic head.

Figure 2:
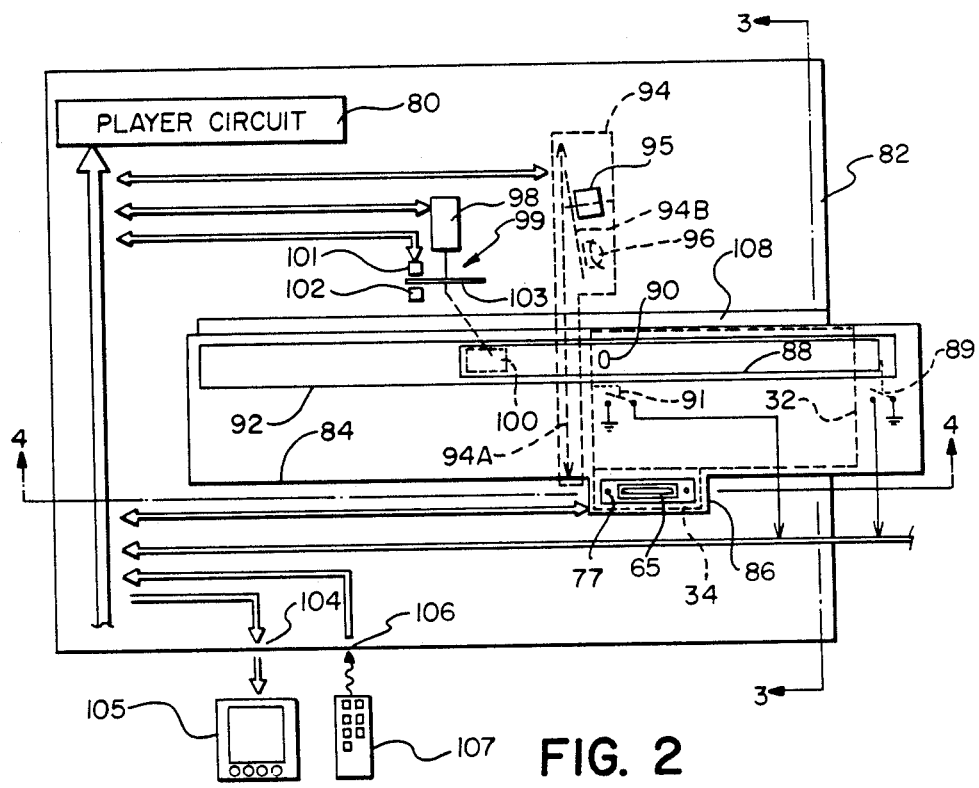
FIG. 2 is a partially schematic plan view of a magnetic recorder/reproducer apparatus capable of operating a disk drive in accordance with the invention.
Figure 3:
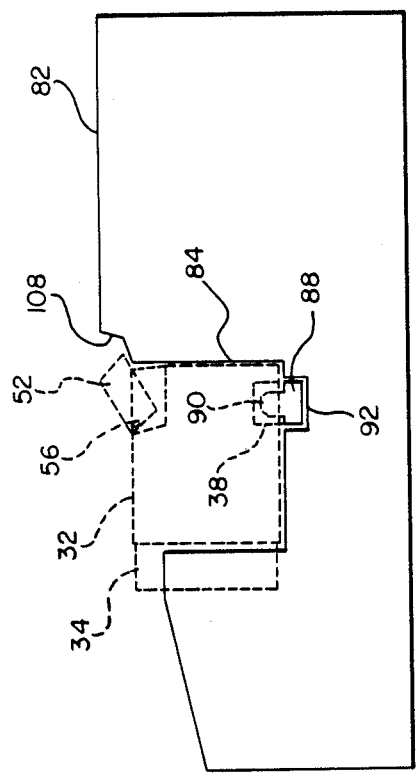
FIG. 3 is a sectional view of the apparatus of FIG. 2 taken along the line 3—3.
Figure 4:
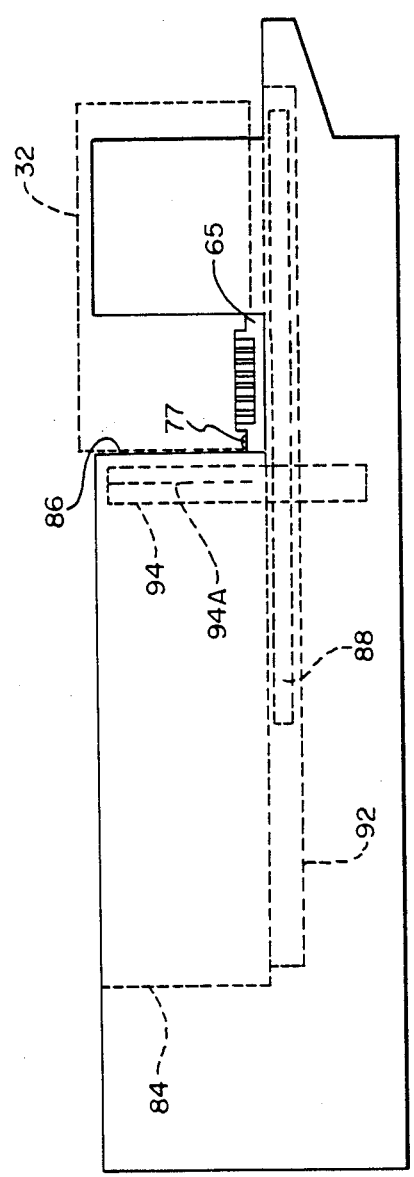
FIG. 4 is a sectional view of the apparatus of FIG. 2 taken along the line 4—4.

Referring now to FIGS. 2, 3, and 4, the aforementioned magazine is depicted in broken line by reference numeral 32 while its companion memory module 34 (also shown in broken line) is mounted on one side thereof for communication with the player through an electrical socket 65. A mounting bolt 77 interacts with the module 34 to cause its release from the magazine 32 so that the magazine 32 can move in the player without disturbing the electrical connection between the module 34 and the player. (The mounting bolt 77 engages an unlocking plunger (not shown) on the module 34 to cause its release, an interaction explained in detail at column 7 of the referenced U.S. Pat. No. 4,675,755). FIG. 2 is a partially schematic view in that it shows both a player circuit 80 with its input and output connections and an outline of the physical enclosure 82 of the player and certain other physical parts that cooperate with the magazine 32.

The enclosure 82 includes a channel 84 for receiving the magazine 32. One side of the channel 84 is formed into a pocket 86 for receiving the memory module 34. (The socket 65 and the mounting bolt 77 are shown at the base of the pocket 86.) The magazine sits atop an elongated rack 88 having a geared underside. Before loading the magazine 32 into the player, the rack 88 is repositioned until it trips a switch 89, indicating to the circuit 80 that the rack 88 is in position to receive a magazine 32. In this position a magazine drive slot 38 on the magazine 32 (see FIG. 3) receives a locating nub 90 on the rack 88 when the magazine 32 is placed into the channel 84. At the same time the memory module 34 slips into the pocket 86 and engages the socket 65. The mounting bolt 77 forces the aforementioned plunger (not shown) upward, thereby releasing the module from the magazine. With the magazine 32 in place, and the memory module 34 unlocked from the magazine, the rack 88 is conditioned for movement, and the magazine 32 therewith, along a track 92. A switch 91 is tripped when the rack 88 moves the magazine 32 its maximum distance into the player, indicating to the circuit 80 that the last cartridge is in position for access.

The player circuit 80 is shown connected to several parts of the video disk player. One connection is to a shuttle transport and disk drive assembly 94, which removes a cartridge 10 from the magazine 32 and moves it into the player along the path 94A. There it is pivoted (to path 94B) so that the hub 16 of the disk engages the spindle of a drive motor 95 and the window 28 receives a read-write head 96. The circuit 80 also communicates control signals to and from a magazine drive motor 98 and a motion sensor 99, which detects operation of the motor 98. The drive motor 98 connects by reduction gearing to a pinion gear 100, which drives the magazine rack 88. The motion sensor 99 includes a chopper wheel 103 interposed between a photosensor 101 and a photoemitter 102. Pulse signals from the photosensor 101 correlate to movement of the rack 88 and the magazine 32 therewith. The player circuit 80 also receives magazine position signals from the switches 89 and 91. The circuit 80 further connects with the memory devices in the memory module 34 by way of the socket 65.

The remaining circuit connections are directed to input/output terminals 104 and 106. A television 105 is connected to terminal 104 for viewing pictures and data retrieved from the magnetic disk 14 and the module 34. A hand controller 107 is coupled by infra-red radiation to the terminal 106. Buttons are provided on the controller for controlling magazine movement, picture selection, and similar functions. Pressing one of these buttons on the hand controller 107 applies a corresponding infra-red signal to the terminal 106, which includes an infra-red sensor and decoder. From there the decoded signal is conveyed to the player circuit 80.

The sectional view of FIG. 3 shows that the enclosure 82 has a beveled seat 108 which catches the edge of a cover 52 when the magazine 32 is placed into the channel 84. The cover 52 pivots around a pin 56, thus fully opening the cartridge storage slots to the player and permitting the cartridges 10 to be pushed from the magazine 32. For this to happen the magazine 32 is advanced forward by driving the rack 88 until the desired cartridge storage slot is aligned with the shuttle path 94A. Then the cartridge is removed from the magazine 32 and moved into the video disk player adjacent the head 96 for playback.

Figure 5:
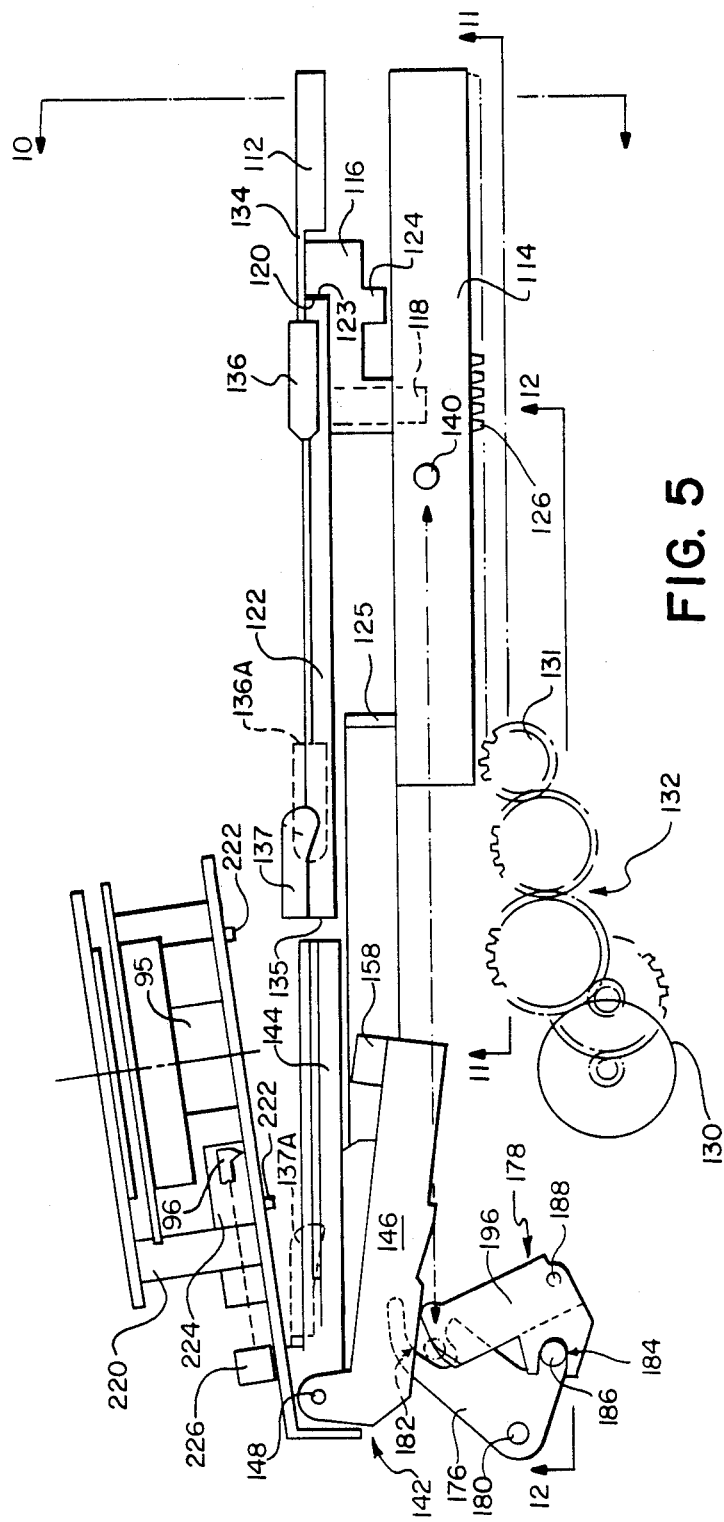
FIG. 5 is a detail plan view of the cartridge shuttle and disk drive shown schematically as part of FIG. 2.
Figure 12:
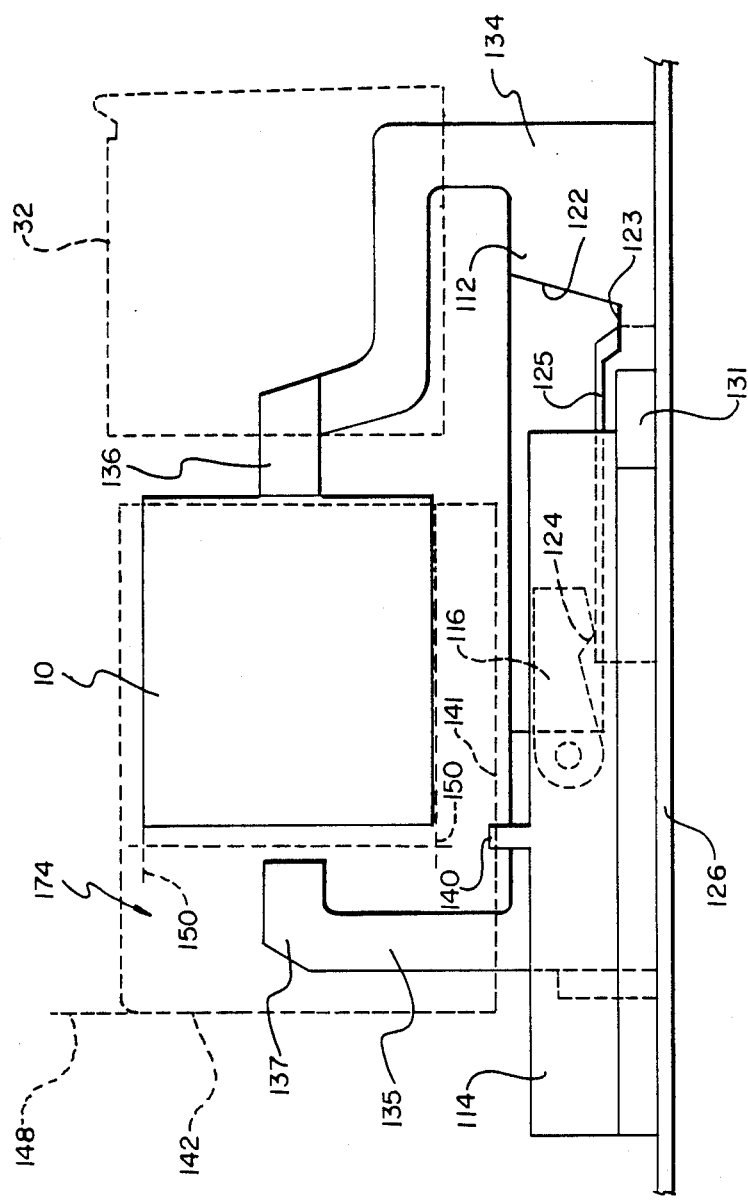
FIG. 12 is a sectional side elevation of the shuttle taken along the broken line 12—12 of FIG. 5 showing the position of the shuttle relative to the magazine after a cartridge has been removed.

FIGS. 5 through 12 are detail views of various parts of the mechanism included within the shuttle transport and disk drive assembly 94 for moving a cartridge out of the magazine 32. Looking first at the shuttle as shown generally in FIG. 5, it is composed of a first slider 112 and a second slider 114 interconnected by a pivotable latch 116. The latch 116 pivots about a pivot pin 118 and has, at its other end, a hook 120. The first slider 112 has a cavity 122 (see FIGS. 10-12, especially) cut away from one side. The part of the cavity 122 adjacent the hook end 120 of the latch 116 has a notch 123 that engages the hook 120. In the space between sliders 112 and 114 the latch 116 has a bevel edge 124 that, in operation, cooperates with a camming block 125. Referring mainly to FIG. 5, one side of the slider 114 is formed into a rack gear 126. A shuttle drive motor 130 is connected to a pinion gear 131 by way of a set of reduction gears 132. The pinion gear 131 mates with the rack gear 126. The rotation of the pinion gear 131 causes the movement of the second slider 114 and, by means of the latch 116, the first slider 112. As also seen in FIGS. 11 and 12, the first slider 112 includes a fore blade 134 and an aft blade 135 on which are mounted respective fore and aft pushers 136 and 137. Each pusher has a shaped nose that is adapted to push the cartridge, either from the magazine 32 into a pivotable loading assembly 142 (shown in FIG. 5) or from the assembly 142 back into the magazine. The second slider 114 also includes a camming pin 140 which is positioned so that, in operation, it travels toward the pivotable loading assembly 142.

Figure 6:
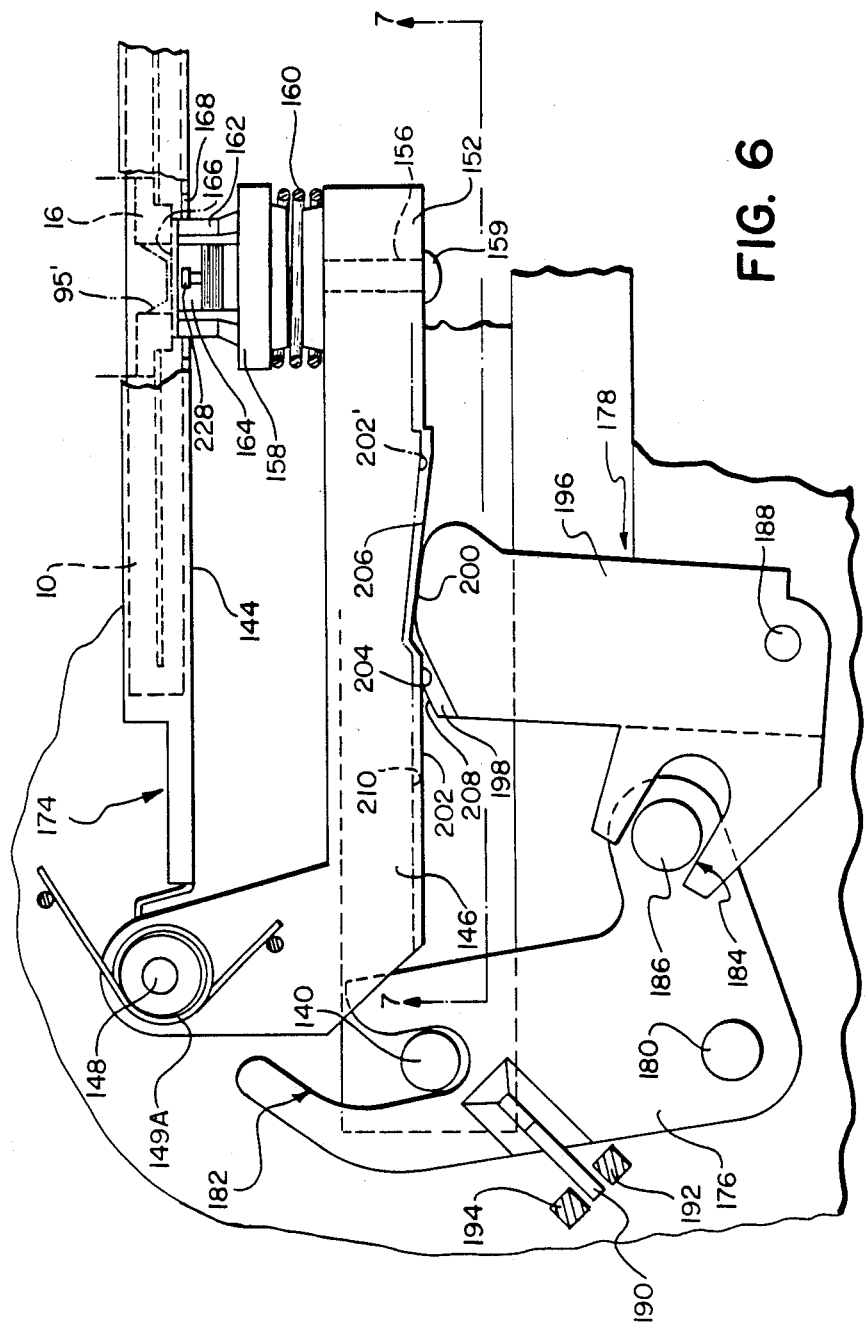
FIG. 6 is an enlarged plan view of the loading assembly shown in FIG. 5.
Figure 8:
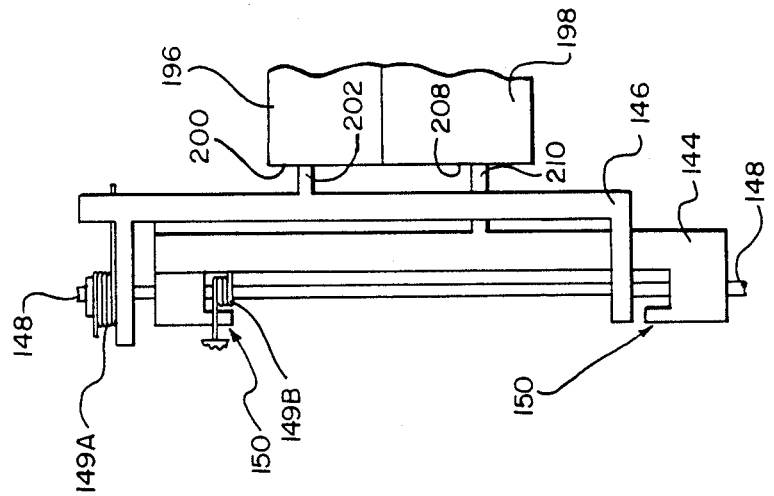
FIG. 8 is an end elevation of the door and backer taken along the line 8—8 of FIG. 7.
Figure 7:
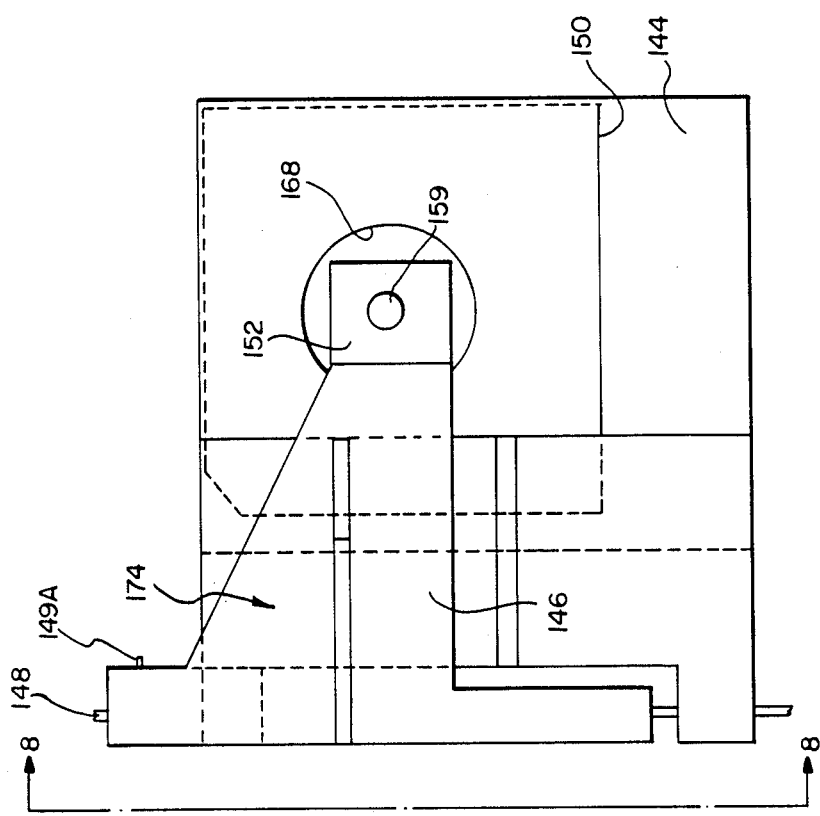
FIG. 7 is a side elevation of the door and backer taken along the line 7—7 of FIG. 6.

The loading assembly 142, which is shown in part in further, enlarged detail in FIG. 6, incldes a door 144 and a backed 146 commonly rotatable around a pivot post 148. Springs 149A and 149B (better shown in FIG. 8) are coiled around the post 148 and confined by stops for respectively biasing the door 144 and the backer 146 into their respective positions shown in FIG. 5. (The spring 149B is preferably heavier than the other spring 149A as it must provide sufficient tension to open the door 144 and remove the cartridge 10 from the drive spindle.) The door 144 pivots between an open position (shown in FIG. 5), in which a u-shaped cartridge channel 150 in the door 144 (as shown in FIG. 8) is aligned with a cartridge slot in the magazine, and a closed position (shown in FIG. 6) in which a cartridge 10 (shown in broken line) is positioned in the channel 150 proximate a drive spindle 95' (shown in broken line) and the transducing gap of the head 96 (shown in FIG. 2). The backer 146 includes a cantilevered support 152 having a bearing diameter for supporting a journal 156 of a slidable hub seater 158. The journal 156 includes a stop 159 which is normally biased against the support 152 by a spring 160. The hub seater 158 further includes a cup-shaped face 162 having a center opening 164 (also shown in front elevation in FIG. 9). The backer 146 pivots from an open position outboard of the open door (as shown in FIG. 5) to an overtravel position in which the cup-shaped face 162 of the hub seater 158 presses the hub 16 against a shoulder of the spindle 95' under the spring load of the coiled spring 160. The overtravel position is shown in part by the broken line position 166 in FIG. 6. The backer 146 then retreats to an offset position (shown by the solid outline of the seater 158 in FIG. 6) in which the cup-shaped face 162 clears the hub 16 by a small amount. As best shown in side elevation in FIG. 7, the door 144 includes a circular opening 168 through which the hub seater 158 can penetrate to meet the hub 16.

The door 144 and the backer 146 are pivoted by the interaction of a lever 176 and a camming block 178. The lever 176 rotates counterclockwise around a pivot post 180 when a slot 182 is engaged by the camming pin 140 on the second slider 114. The camming block 178 includes a slot 184 for engaging a post 186 depending from the lever 176. Due to the slot 184-post 186 interconnection the camming block 178 is rotatable in a clockwise direction around a pivot post 188. The lever 176 also supports a flag 190 (FIG. 6) which breaks a signal path between the sensor parts 192 and 194 when the loading assembly 142 is in its operating position (as shown in FIG. 6).

The camming block 178 supports an upper actuating arm 196 for engagement with the backer 146 and a lower actuating arm 198 for engagement with the door 144. The upper actuating arm 196 has a camming surface 200 (defined by its radius from the center of the pivot 188) that is operatively associated with a cam follower surface 202 on the backer 146. The cam follower surface 202 is sectioned into an overtravel land 204 and an offset land 206. The lower actuating arm 198 has a camming surface 208 that operatively associates with a cam follower surface 210 attached to the door 144.

It is apparent from FIG. 6 that rotation of the camming block 178 causes the camming surface 208 on the lower actuating arm 198 to slide across the cam follower surface 210, thereby forcing the door 144 (and the cartridge within) into its closed position as shown by FIG. 6. During substantially the same period, the camming surface 200 of the upper actuating arm 196 slides across the overtravel land 204, thereby forcing the backer 146, and the hub seater 158 therewith, to travel toward the cartridge 10 until the cup-shaped face 162 is forced against the hub 16 (the overtravel position). In this position the cam follower surface 202 is thrust forward to the position 202' shown by broken line and the cup-shaped surface 162 is forced forward into contact with the hub 16 (as shown by the broken line 166). (In this connection it is noted that the actuating arms 196 and 198 are adjustable during manufacture primarily to accommodate variations in dimensional tolerances.) Continued rotation of the camming block 178 causes the camming surface 200 to ride off the overtravel land 204 into the slightly depressed offset land 206. The backer 146 retreats backward (to the offset position) under the biasing force of the spring 149A. In the offset position, the hub seater 158 clears the hub 16 and the disk assembly can be rotated without touching the surface 162.

As shown by comparing the location of the door 144 and the backer 146 in FIGS. 5 and 6, the pivoting of the camming block 178 produces a differential camming action upon the relative positions of the door 144 and the backer 146, that is, the backer 146 must be pivoted through a greater angle, even without overtravel, than must the door 144. This differential movement allows the backer 146 to be spaced away from the door 144 in their respective open positions. This means that the hub seater 158 depending from the cantilevered support arm 152 of the backer 146 will not, in its open position, penetrate into the circular opening 168 in the door 144, thus allowing a cartridge to be inserted into (or removed from) the door 144.

Referring to FIG. 5, the hub motor 95 is mounted on a rigid support 220 at a few degrees with respect to the open position of the loading assembly 142. Two alignment pins 222 protrude from the support 220 for engagement with the alignment holes 31 in the cartridge 10 (see FIG. 1). The read-write head 96 is mounted on a head carriage 224 which displaces the head 96 from track to track on the magnetic disk 14. The carriage 224 is connected with a positioner motor 226 by, for example, a lead screw, band positioner, cam drive or the like.

The operation of the shuttle transport and disk drive assembly 94 shown in FIG. 2 is as follows. Referring to FIG. 5, the shuttle motor 130 is started, moving the second slider 114 and the first slider 112 therewith. The pusher 136, attached to the first slider 112, begins to push the cartridge 10 out of the magazine. It is shown by FIGS. 11 and 12 how the shuttle operates in order to remove a cartridge from the magazine. In particular, the pusher 136 enters the cartridge storage slot and pushes the cartridge to a pre-play position at which the cartridge is positioned in the channel 150 in the door 144 and opposite-but still offset a few degrees from-the hub motor 95 and the read-write head 96. A suitable detent (not shown) catches the top of the shutter 29 and opens it as the cartridge is pushed into the loading assembly 142. The pre-play position is seen in FIGS. 5 and 12 by the unpivoted position of the loading assembly 142. At this point, with the motor 130 continuing to drive the second slider 114, the bevel edge 124 of the latch 116 rides up and over the camming surface of the block 125. With the latch 116 pivoted upward, its hook end 120 rides loose from the first slider 112. The first slider 112, along with the blades 134 and 135 and the pushers 136 and 137, stops. (The respective pushers are shown in broken line to be in positions 137A and 136A in FIG. 5.)

Meanwhile, the second slider 114 continues to advance, forcing the camming pin 140 into engagement with slot 182 of the lever 176. The slider 114 advances further until the camming pin 140 forces the lever 176 to rotate, causing the camming block 178 to bring its actuating arms into contact with the respective camming surfaces on the door 14 and the backer 146. Further movement of the slider 114, and the camming pin 140, rotates the door 144 into its closed position with the hub 16 engaged by the spindle 95' of the drive motor 95. (As shown in FIG. 6 the door 144 is relieved in an area 174 near the pivot post 148 to allow the pusher blade 135 and the aft pusher 137 sufficient clearance when the door 144 is in its closed position (also see FIG. 12).) Simultaneously, the backer 146 is rotated fully forward through the overtravel position whereupon the hub 16 is positively and fully engaged upon the spindle. Thereafter, the backer 146 retreats slightly so as to permit the hub 16 to rotate without contacting the hub seater 158. The alignment pins 222 simultaneously position the cartridge 10, and the disk 14 herewith, relative to the read-write head 96. Coincidentally, the flag 190 (FIG. 6) interrupts the sensors 192, 194 and a signal is thereupon provided to the circuit 80 to turn off the shuttle drive motor 130 and to indicate that the disk 14 is ready for read-write operation (i.e., the drive motor 96 may be turned on). The aforementioned operation is reversed in order to back the cartridge off the loading assembly 142 and into the magazine 32. In particular, as the actuating arms of the camping block 178 reverse their rotation and relieve their pressure upon the door 144 and the backer 146, the flanges of the u-shaped channel 150 pull the cartridge 10 off the spindle 95' under tension of the spring 149B. The remaining operation of moving the cartridge 10 from the door 144 into the magazine 32 is just the inverse of the previously-described operation.

The precise positioning of the hub seater 158 with respect to the surface of the hub 16 in the offset position of the backer 146 enables the hub seater 158 to cooperate with the disk 14 in phase detection. For example, in connection with still video recording, a metallic phase indicia is embedded into the hub. When the disk is rotating, the indicia provides phase information by passing a reference position once each revolution. Referring to FIGS. 6 and 9, the hub seater 158 also supports a phase sensor 228 in the opening 164 bounded by the cup-shaped face 162. The sensor 228 is arranged off-center with respect to the hub 16 so that it intercepts the embedded phase indicia once each revolution and provides a phase signal to the circuit 80.

The invention has been described in detail with particular reference to a presently preferred embodiment thereof, but it will be understood that variations and modifications can be effected within the spirit and scope of the invention.

What is claimed is:

1. Magnetic recording/reproducing apparatus having a disk drive for positioning a cartridge with respect to a drive spindle for rotating a magnetic disk enclosed within the cartridge, the disk being centrally supported by a hub exposed to the drive spindle through an aperture in the cartridge, said apparatus comprising:

door means for supporting the cartridge relative to a door pivot, said door means pivotable between an open position in which the cartridge is received to a closed position in which the cartridge is positioned for engagement with the drive;

backer means mounted relative to a backer pivot for forcing the hub upon the spindle, said backer means pivotable between an open position outboard of said door means to an overtravel position forcing the hub upon the spindle and then to an offset position backed away from the hub;

means for inserting the cartridge into said door means; and means operative in combination with said inserting means for differently pivoting said door means and said backer means, said door means being pivoted to its closed position while said backer means pivots to its overtravel position and then reverse pivots to its offset position, whereby said backer means temporarily overtravels said door means to forcibly mount the hub upon the spindle before reversing to break contact with the hub.

2. Apparatus as claimed in claim 1 in which said door means and said backer means are differentially pivoted about the same pivot axis.

3. Apparatus as claimed in claim 2 in which said door means pivots through a lesser angle than said backer means.

4. Apparatus as claimed in claim 3 in which the overtravel position of said backer means is pivotally inward of the closed position of said door means and the offset position of said backer means is pivotally outward of the closed position of said door means.

5. Apparatus as claimed in claim 1 in which said door means and said backer means include respective cam follower surfaces and said differential pivotal means includes a differential cam for operating upon said cam follower surfaces.

6. Apparatus as claimed in claim 5 in which said cam follower surface on said backer means is a stepped follower surface providing a reversible, stepped pivot action in the movement of said backer means.

7. Magnetic recording/reproducing apparatus having a disk drive for positioning a cartridge with respect to a drive spindle for rotating a disk enclosed within the cartridge, the cartridge having an aperture for exposing a central hub of the disk and being one of a plurality contained in a magazine receivable into the apparatus, said apparatus comprising:
backer means mounted relative to a backer pivot for seating the hub upon the spindle, said backer means supporting a hub seating member for movement along an arcuate path toward the drive spindle;
door means interposed between said backer means and the drive spindle for supporting the cartridge relative to a door pivot, said door means having an opening in the path of said hub seating member and exposing the central hub therethrough;
means biasing said backer and door means into respective open positions in which said hub seating member is clear of the opening in said door means;
shuttle means adapted to move a cartridge from the magazine into said door means;
drive means adapted to differentially pivot said door means and said backer means, said door means pivotable from its open position to a closed position proximate the spindle and said backer means pivotable from its open position to an overtravel position, in which said hub seating member penetrates the opening to positively seat the hub upon the spindle, and to an offset position in which the hub heat seating member is closely spaced from the hub; and
means for actuating said shuttle means and said drive means in one substantially continuous motion whereby the door and backer means are differentially pivoted after said shuttle means moves the cartridge into said door means.

8. Apparatus as claimed in claim 7 in which said door means and said backer means are differentially pivoted about the same pivot axis.

9. Apparatus as claimed in claim 7 in which the hub includes a sensible indicia for rotation therewith and said hub seating member supports a sensor for generating a periodic phase signal from the rotating indicia.

10. Magnetic recording/reproducing apparatus having a disk drive for supporting a cartridge with respect to an operating position in which a drive spindle rotatably engages a disk enclosed within the cartridge, the cartridge having an aperture for exposing a central hub of the disk to the drive spindle, said disk drive comprising:
backer means supported for movement relative to a backer pivot for seating the hub upon the spindle and then retreating to an offset position spaced from the hub;
a hub seating member depending from said backer means and movable therewith in an arcuate path to engage the surface of the hub;
door means interposed between said backer means and the operating position for supporting the cartridge relative to a door pivot for movement toward the operating position, said door means having an opening in the path of said hub seating member and exposing the central hub therethrough for engagement with said hub seating member;
means biasing said backer and door means into respective open positions in which said hub seating member is clear of the opening in said door means and said door means is pivotally spaced from said operating position;
shuttle means for advancing a cartridge toward the open position of said door means;
a camming member depending from said shuttle means; and
means engaging said camming member for pivoting said door means toward said operating position while momentarily pivoting said backer means to an intermediate position in which said hub seating member overtravels said door means, thereby penetrating said opening and pressing the hub upon the drive spindle, before retreating to the offset position spaced from the hub.

11. Apparatus as claimed in claim 10 in which said door and backer means pivot around a common axis and include respective cam follower surfaces, and said means engaging said camming member for pivoting said door and backer means further includes a pair of cams configured to engage the respective cam follower surfaces and provide movement of said door and backer means.

12. Apparatus as claimed in claim 11 in which said cam follower surface of said backer means includes a sharply stepped region for providing the momentary overtravel and retreat motions of said backer means.

* * * * *

UNITED STATES PATENT AND TRADEMARK OFFICE
CERTIFICATE OF CORRECTION

PATENT NO. : 4,833,555

DATED : May 23, 1989

INVENTOR(S) : R. M. Humphreys

It is certified that error appears in the above-identified patent and that said Letters Patent is hereby corrected as shown below:

Column 9, line 34, delete "heat".

Signed and Sealed this

Eighth Day of May, 1990

Attest:

*Attesting Officer*

HARRY F. MANBECK, JR.

*Commissioner of Patents and Trademarks*